US012683235B2

(12) United States Patent
Noh et al.

(10) Patent No.: US 12,683,235 B2
(45) Date of Patent: Jul. 14, 2026

(54) SECONDARY BATTERY AND DEVICE INCLUDING THE SAME

(71) Applicant: LG Energy Solution, Ltd., Seoul (KR)

(72) Inventors: Soodong Noh, Daejeon (KR); Kwan Soo Lee, Daejeon (KR); Jeahyeok Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 268 days.

(21) Appl. No.: 18/008,025

(22) PCT Filed: Sep. 29, 2021

(86) PCT No.: PCT/KR2021/013354
§ 371 (c)(1),
(2) Date: Dec. 2, 2022

(87) PCT Pub. No.: WO2022/071759
PCT Pub. Date: Apr. 7, 2022

(65) Prior Publication Data
US 2023/0253667 A1      Aug. 10, 2023

(30) Foreign Application Priority Data

Sep. 29, 2020      (KR) ........................ 10-2020-0127296

(51) Int. Cl.
H01M 50/333      (2021.01)
H01M 50/102      (2021.01)
(Continued)

(52) U.S. Cl.
CPC ....... H01M 50/333 (2021.01); H01M 50/102 (2021.01); H01M 50/152 (2021.01);
(Continued)

(58) Field of Classification Search
CPC ............. H01M 50/333; H01M 50/102; H01M 50/152; H01M 50/533; H01M 50/578;
(Continued)

(56) References Cited

U.S. PATENT DOCUMENTS 5,523,178 A      6/1996  Murakami et al.
9,537,184 B2 *   1/2017  Takahashi ............. H01M 10/48
(Continued)

FOREIGN PATENT DOCUMENTS

CN      100359717 C      1/2008
JP      H06290767      * 10/1994  ............ H01M 10/04
(Continued)

OTHER PUBLICATIONS

International Search Report for PCT/KR2021/013354 mailed Jan. 12, 2022. 3 pgs.
(Continued)

*Primary Examiner* — Adam J Francis
(74) *Attorney, Agent, or Firm* — Lerner David LLP

(57) ABSTRACT

A secondary battery according to an embodiment of the present disclosure includes an electrode assembly; a battery case that houses the electrode assembly; and a cap assembly that is coupled to an open upper part of the battery case. The cap assembly comprises a current interrupt device (CID); a safety vent located on the current interrupt device and electrically connected to the current interrupt device; and an insulating disk located between the current interrupt device and the safety vent.

13 Claims, 6 Drawing Sheets

100

(51) Int. Cl.
    *H01M 50/152*     (2021.01)
    *H01M 50/533*     (2021.01)
    *H01M 50/578*     (2021.01)
(52) U.S. Cl.
    CPC ....... H01M 50/533 (2021.01); H01M 50/578
          (2021.01); *H01M 2200/20* (2013.01)
(58) Field of Classification Search
    CPC .......... H01M 50/3425; H01M 50/172; H01M
          50/30; H01M 50/342; H01M 50/572;
          H01M 2200/20; H01M 10/052
    See application file for complete search history.

(56) References Cited

U.S. PATENT DOCUMENTS

| | | | | |
|---|---|---|---|---|
| 2005/0118495 A1* | 6/2005 | Kim | ................... | H01M 50/578 |
| | | | | 429/54 |
| 2005/0214641 A1* | 9/2005 | Kim | ................... | H01M 50/169 |
| | | | | 429/170 |
| 2009/0087724 A1* | 4/2009 | Kim | ................... | H01M 50/171 |
| | | | | 429/82 |
| 2009/0098445 A1* | 4/2009 | Kim | ................... | H01M 50/578 |
| | | | | 429/163 |
| 2011/0008654 A1* | 1/2011 | Kim | ................. | H01M 50/3425 |
| | | | | 429/56 |
| 2012/0171534 A1 | 7/2012 | Sugimoto et al. | | |
| 2012/0282504 A1* | 11/2012 | Kim | ................... | H01M 50/169 |
| | | | | 429/82 |
| 2013/0115511 A1* | 5/2013 | Han | ..................... | H01M 10/52 |
| | | | | 429/208 |
| 2014/0302358 A1 | 10/2014 | Kim et al. | | |
| 2015/0236334 A1 | 8/2015 | Lee et al. | | |
| 2016/0099443 A1* | 4/2016 | Lee | ................... | H01M 50/184 |
| | | | | 429/7 |

| | | | | |
|---|---|---|---|---|
| 2020/0313151 A1 | 10/2020 | Haraguchi et al. | | |
| 2021/0203047 A1 | 7/2021 | Haraguchi et al. | | |
| 2022/0069408 A1* | 3/2022 | Yoshida | ............. | H01M 50/107 |

FOREIGN PATENT DOCUMENTS

| | | | |
|---|---|---|---|
| JP | H06290767 A | | 10/1994 |
| JP | H08083600 A | | 3/1996 |
| JP | H11224658 A | | 8/1999 |
| JP | 2005108503 A | | 4/2005 |
| JP | 2005285404 A | * | 10/2005 |
| JP | 2006099974 A | * | 4/2006 |
| JP | 2009135024 A | | 6/2009 |
| JP | 2009158381 A | | 7/2009 |
| JP | 2014041785 A | * | 3/2014 |
| JP | 2014531128 A | | 11/2014 |
| JP | 2015156375 A | | 8/2015 |
| KR | 20000014670 A | | 3/2000 |
| KR | 20010046466 A | | 6/2001 |
| KR | 20080050642 A | | 6/2008 |
| KR | 20090021482 A | | 3/2009 |
| KR | 101330612 B1 | | 11/2013 |
| KR | 101678735 B1 | | 11/2016 |
| KR | 20180075797 A | | 7/2018 |
| WO | 2011067931 A1 | | 6/2011 |
| WO | 2017163999 A1 | | 9/2017 |
| WO | 2019082711 A1 | | 5/2019 |
| WO | 2020137372 A1 | | 7/2020 |

OTHER PUBLICATIONS

Extended European Search Report including Written Opinion for Application No. 21876034.6 dated May 28, 2024, pp. 1-8.
Third Party Observation for Application No. 21876034.6 dated Jul. 18, 2024, pp. 1-4.

* cited by examiner

【FIG. 1】
Prior Art    10
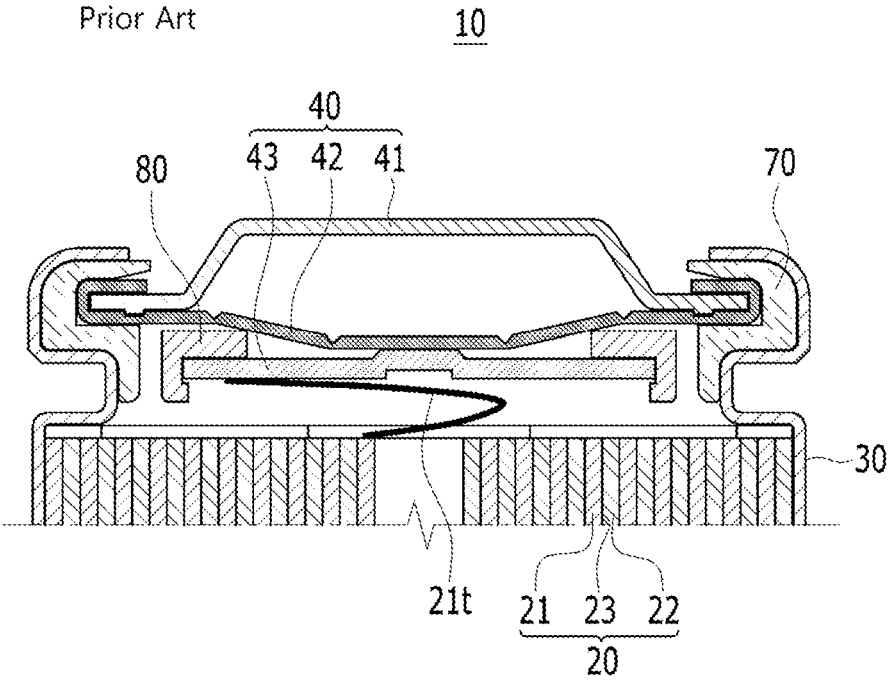
【FIG. 2】
Prior Art    10
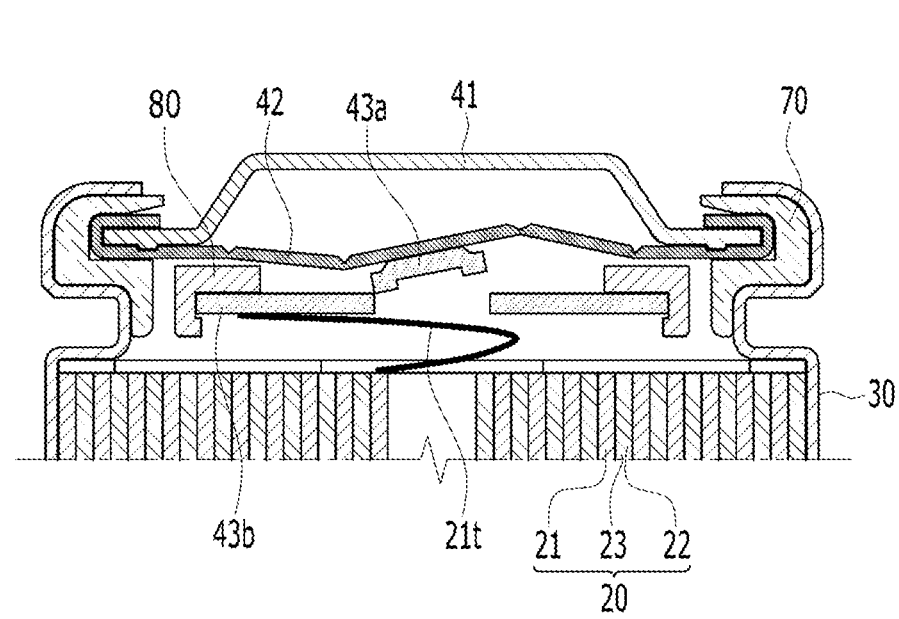

【FIG. 3】
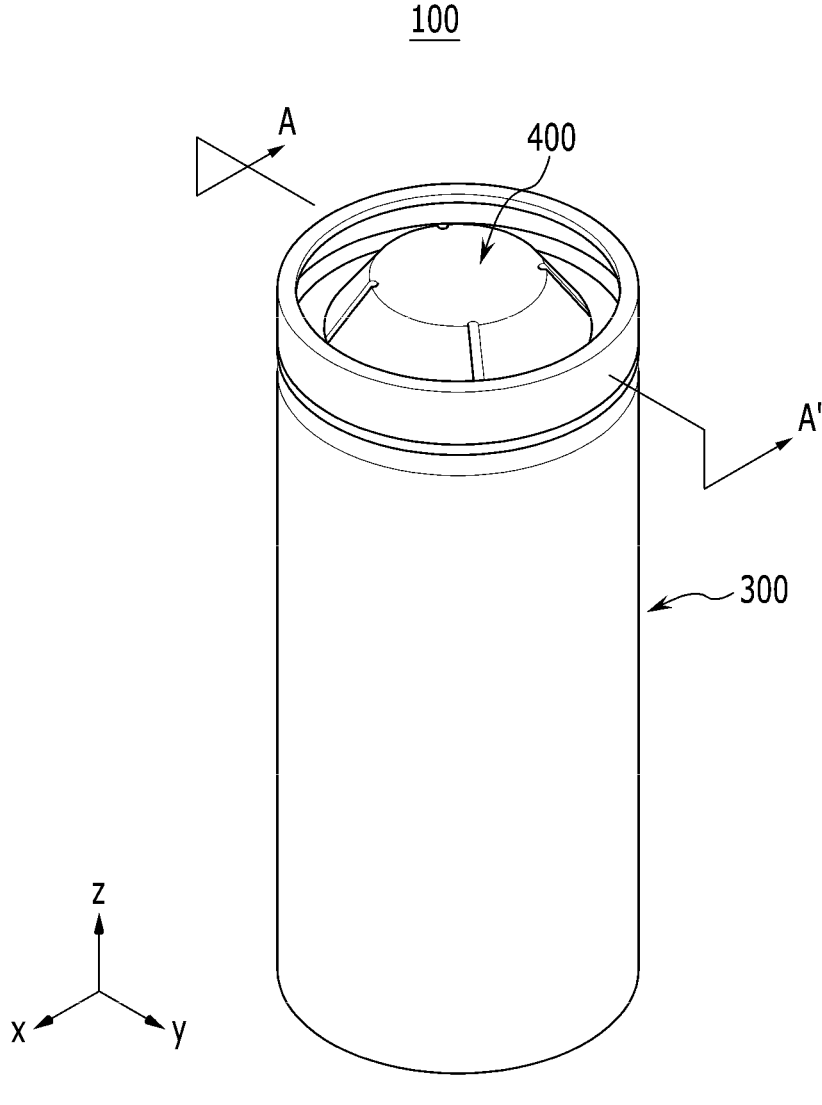

【FIG. 4】
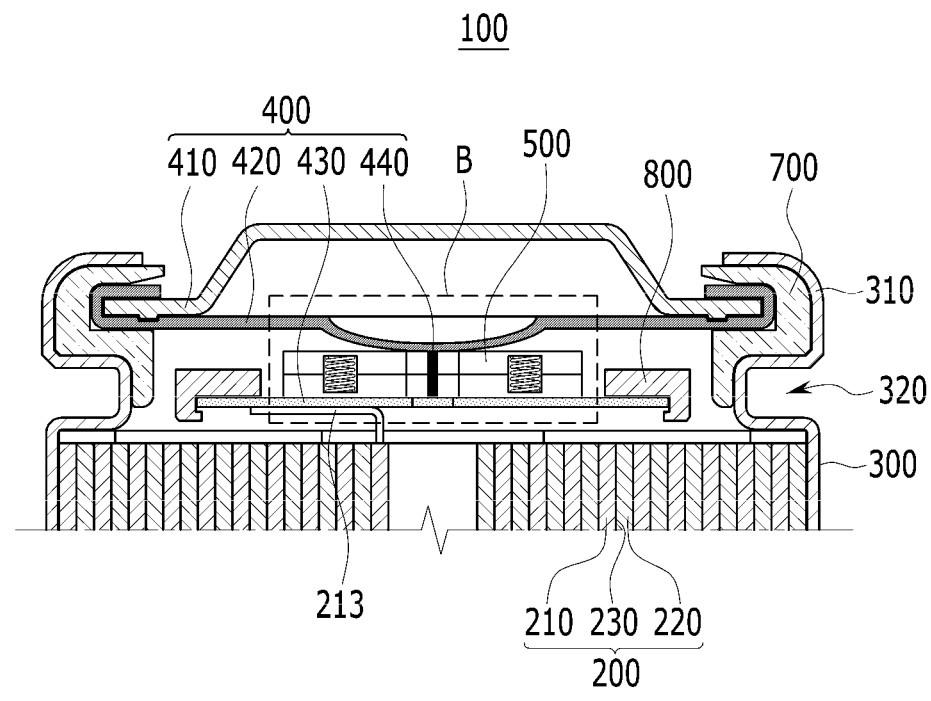
【FIG. 5】
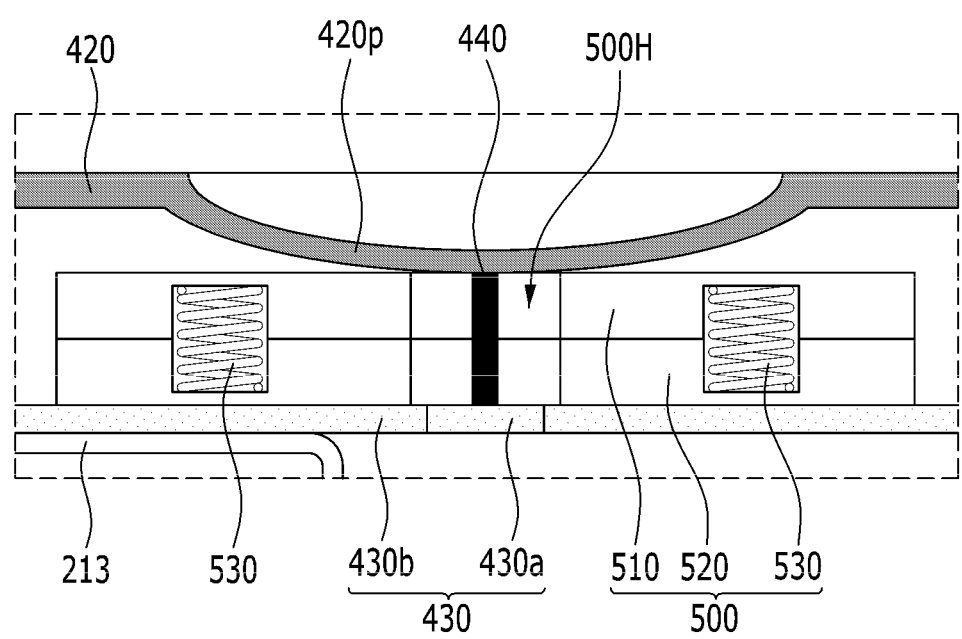

【FIG. 6】
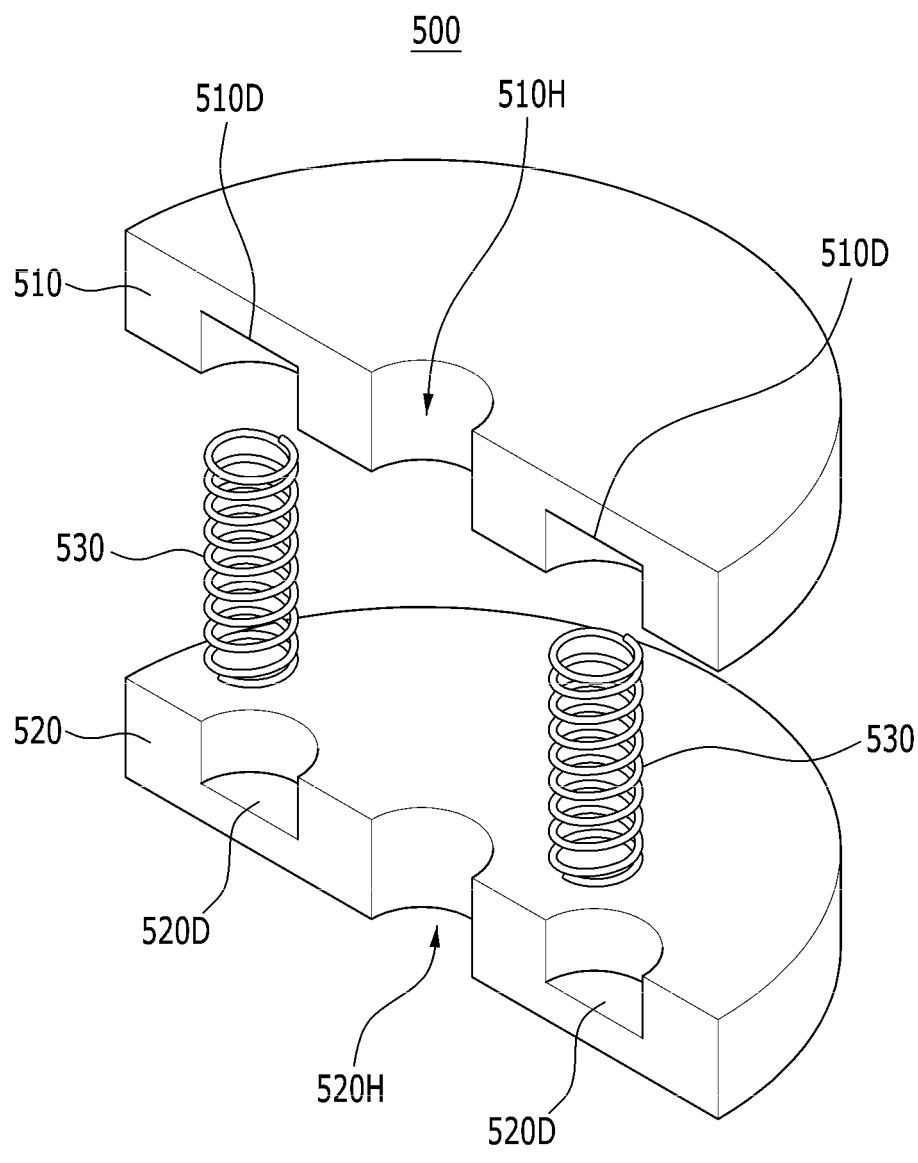

【FIG. 7】
100
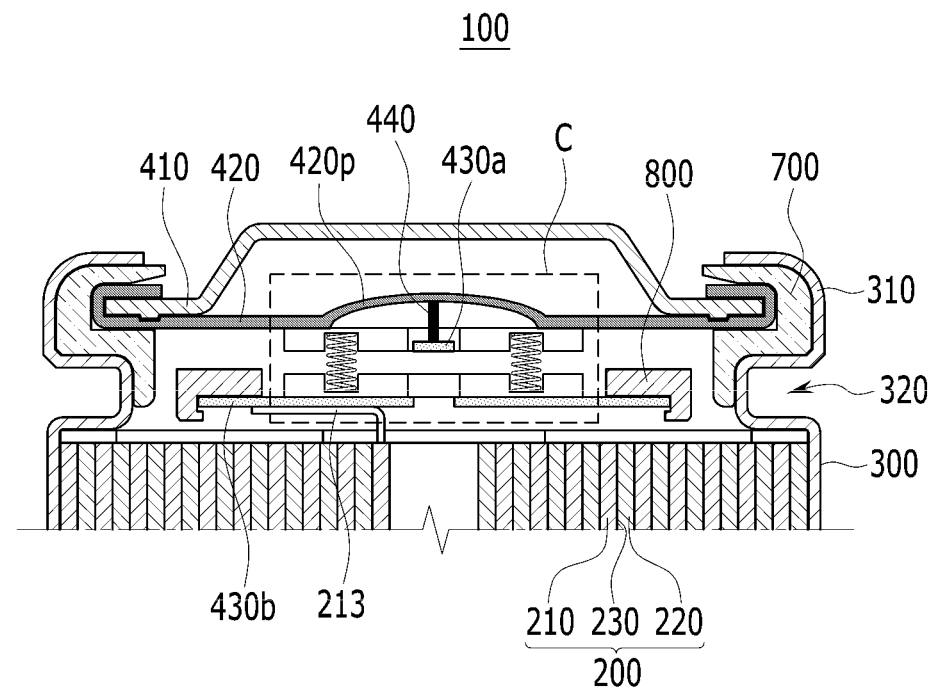
【FIG. 8】
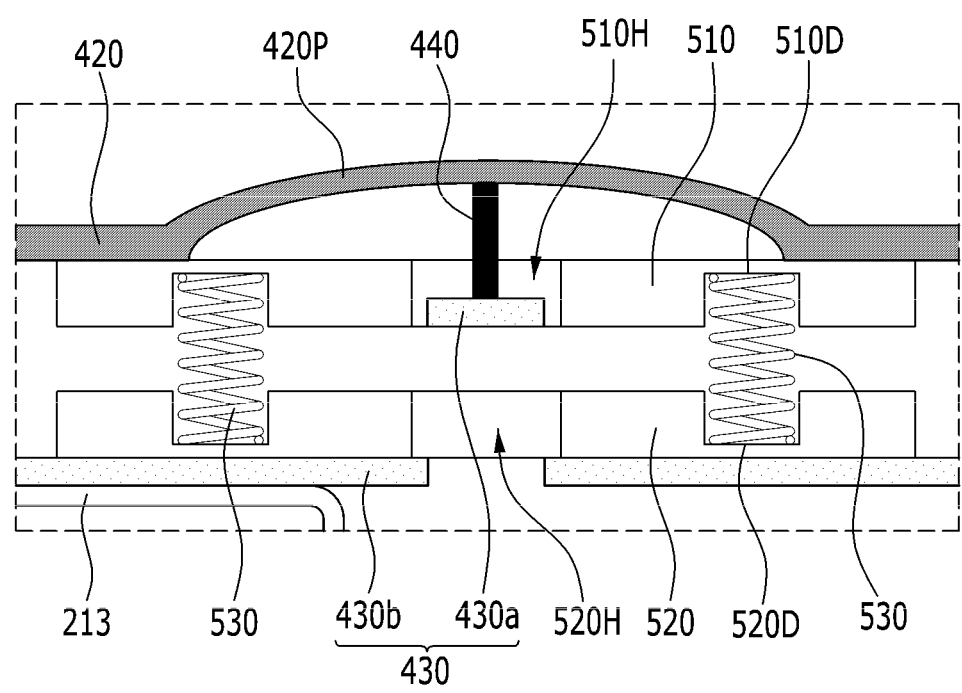

【FIG. 9】
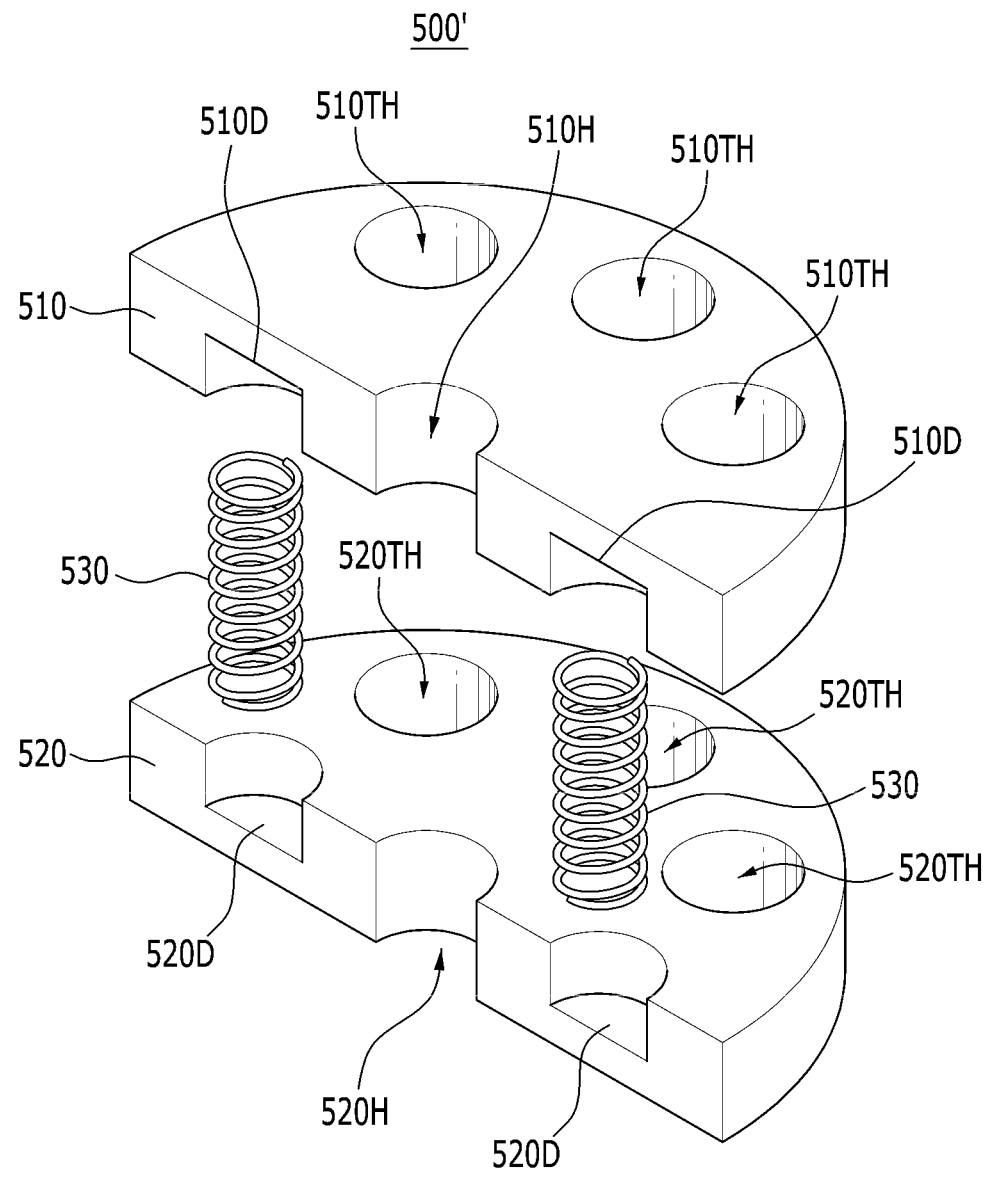

SECONDARY BATTERY AND DEVICE INCLUDING THE SAME

CROSS-REFERENCE TO RELATED APPLICATIONS

This application is a national phase entry under 35 U.S.C. § 371 of International Application No. PCT/KR2021/013354 filed Sep. 29, 2021, which claims priority from Korean Patent Application No. 10-2020-0127296 filed on Sep. 29, 2020, the disclosures of which are incorporated herein by reference in their entirety.

TECHNICAL FIELD

The present disclosure relates to a secondary battery and a device including same, and more particularly, to a secondary battery with improved safety and a device including same

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing considerable attention.

In particular, with the increase of the technological development and demand for a mobile device, demand for a battery as an energy source rapidly increases, and accordingly, much research on batteries satisfying various needs has been carried out.

Typically, there is a high demand for lithium secondary batteries, such as a lithium ion battery or a lithium ion polymer battery, which have advantages such as a high energy density, a discharge voltage, an output stability.

Secondary batteries may be classified based on the structure of an electrode assembly having a structure in which a positive electrode and a negative electrode are stacked in the state in which a separator is interposed therebetween. Typically, there may be mentioned, for example, a jelly-roll type electrode assembly (having a structure in which long sheets of positive electrodes and negative electrodes are wound in the state in which a separator is interposed therebetween), a stacked type electrode assembly (having a structure in which pluralities of positive electrodes and negative electrodes, cut by a certain size unit, are sequentially stacked in the state in which separators are interposed therebetween), or the like. In recent years, in order to solve problems caused by jelly-roll type electrode assemblies and stacked type electrode assemblies, there has been developed a stacked/folded type electrode assembly, which is a combination of the jelly roll type electrode assembly and the stacked type electrode assembly. The stacked/folded type electrode assembly has a structure in which unit cells stacked with predetermined units of the positive electrodes and the negative electrodes are sequentially wound with a separator being interposed therebetween in the state of having been placed on a separation film.

Further, based on the shape of a battery case, the secondary battery is classified into a cylindrical battery (where an electrode assembly is built into a cylindrical case), a prismatic battery (where an electrode assembly is built into a prismatic can), and a pouch type battery (where an electrode assembly is built into a pouch type case of an aluminum laminate sheet).

Meanwhile, secondary batteries include, for example, a nickel cadmium battery, a nickel hydrogen battery, a nickel zinc battery, a lithium secondary battery, and the like. Among these, lithium secondary batteries have advantages over nickel-based secondary batteries in that they have less memory effect, can perform charge and discharge freely, and have a very low self-discharge rate, a high operating voltage, and a high energy density per unit weight, and therefore, are widely used in the field of advanced electronic devices.

However, when a lithium secondary is exposed to high temperature, or when a large amount of current flows in a short time due to overcharge, an external short circuit, a nail penetration, a local crush, or the like, the battery becomes heated due to IR heat generation, with the result that the battery may explode. In other words, when the pressure or temperature of the battery increases, the decomposition reaction of the active material and many side reactions proceed, whereby the temperature of the battery is sharply increased, which again accelerate the reaction between the electrolyte and the electrodes. Eventually, a thermal runaway phenomenon occurs in which the temperature of the battery rapidly increases, and when the temperature increases above a certain level, the battery may ignite, and the lithium secondary battery explodes due to the increased internal pressure of the battery.

Therefore, when a lithium secondary battery is placed in an abnormal operating state such as high temperature or high pressure, various methods are being discussed to effectively control this. As part of an effort to ensure safety, there is a method of mounting elements on the outside of the cell and a method of using materials inside the cell, wherein a safety vent that utilizes changes in battery internal pressure corresponds to the former.

FIG. 1 is a partial cross-sectional view showing a cross-section of an upper part of a conventional cylindrical secondary battery.

Referring to FIG. 1, the electrode assembly 20 can be housed in a cylindrical case 30, and a cap assembly 40 can be mounted on the opened upper part of the cylindrical case 30 to complete the manufacture of the cylindrical secondary battery 10.

The electrode assembly 20 may be a jelly-roll type electrode assembly in which a first electrode 21, a second electrode 22 and a separator 23 are wound.

The cap assembly 40 may include an upper end cap 41, a safety vent 42 for internal pressure drop, and a current interrupt device (CID) 43. The upper end cap 41 and the safety vent 42 may form a structure in close contact with each other, and the safety vent 42 may form a structure connected to the center part of the current interrupt device 43. A first electrode tab 21*t* protruding from the first electrode 21 may be connected to a lower end part of the current interrupt device 43. Here, the first electrode 21 may be a positive electrode, and the first electrode tab 21*t* may be a positive electrode tab.

As described above, the upper end cap 41 may be directly or indirectly connected to the safety vent 42, the current interrupt device 43, and the first electrode tabs 21*t* to be electrically connected to the electrode assembly 20, which can function as an electrode terminal.

Meanwhile, a gasket 70 for sealing between the cap assembly 40 and the cylindrical case 30 and a CID gasket 80 for wrapping the edge of the current interrupt device 43 can be disposed.

FIG. 2 is a partial cross-sectional view illustrating a state when the internal pressure of the cylindrical secondary battery of FIG. 1 increases.

Referring to FIG. 2, when the cylindrical secondary battery 10 is exposed to a high temperature or placed in an abnormal operating state that increases the internal pressure, the current interrupt device 43 is separated so as to interrupt the current. Specifically, the current interrupt device 43 is divided into a portion 43*a* connected to the safety vent 42 and a portion 43*b* connected to the first electrode tab 21*t*, so that the current between the upper end cap 41 functioning as an electrode terminal and the first electrode tab 21*t* is interrupted.

However, as shown in FIG. 2, when the shape of the safety vent 42 is not completely reversed or when the external pressure is strong, both parts 43*a* and 43*b* of the current interrupt device 43 may not be completely separated, such that the contact is be maintained. In this case, since the current is not interrupted, overcharge and overdischarge occur, and the temperature increases and gas generation continue, which may eventually lead to ignition and explosion of the cylindrical secondary battery 10.

Therefore, there is a need to develop a technology that can effectively interrupt the current when the internal pressure of the secondary battery increases.

DETAILED DESCRIPTION OF THE INVENTION

Technical Problem

It is an object of the present disclosure to provide a secondary battery that can effectively interrupt the current when the internal pressure increases due to abnormal operating conditions, and a device including the same.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided a secondary battery comprising: an electrode assembly; a battery case that houses the electrode assembly and is opened in its upper part; and a cap assembly that is coupled to the opened upper part of the battery case, wherein the cap assembly comprises a current interrupt device (CID); a safety vent located on the current interrupt device and electrically connected to the current interrupt device; and an insulating disk located between the current interrupt device and the safety vent.

The insulating disk includes an upper disk, a lower disk, and an elastic member located between the upper disk and the lower disk.

An upper indented part indented in an upper direction may be formed on a lower surface of the upper disk, a lower indented part indented in a lower direction may be formed on the upper surface of the lower disk, and the elastic member may be located between the upper indented part and the lower indented part.

Due to the elastic force of the elastic member, a force in the upper direction may act on the upper disk, and a force in the lower direction may act on the lower disk.

The elastic member may be a spring member.

The spring member may be located between the upper disk and the lower disk in a compressed state.

The cap assembly may include a connection part that connects the current interrupt device and the safety vent.

A hole may be formed in the insulating disk, and the connection part may pass through the hole and connect the current interrupt device and the safety vent.

The safety vent may include a protrusion part protruded convexly in a direction in which the current interrupt device is located, and the protrusion part may be connected to the current interrupt device.

When the internal pressure of the secondary battery increases, the shape of the safety vent is reversed, so that the protrusion part may be protruded convexly in a direction opposite to a direction in which the current interrupt device is located.

The current interrupt device may include a center part connected to the protrusion part and an outer peripheral part for wrapping the center part, and when the internal pressure of the secondary battery increases, the center part and the outer peripheral part may be separated as the shape of the safety vent reverses.

The insulating disk may include an upper disk and a lower disk, an upper through-hole may be formed in the upper disk, and a lower through-hole is formed in the lower disk, and the upper through-hole and the lower through-hole may be located so as to correspond to each other.

Advantageous Effects

According to the embodiments of the present disclosure, an insulating disk is provided between the current interrupt device and the safety vent, whereby when the internal pressure of the secondary battery increases, the complete shape reversal of the safety vent can be induced and the current can be effectively interrupted.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a partial cross-sectional view showing a cross-section of an upper part of a conventional cylindrical secondary battery;

FIG. 2 is a partial cross-sectional view illustrating a state when the internal pressure of the cylindrical secondary battery of FIG. 1 is increased;

FIG. 3 is a perspective view of a secondary battery according to an embodiment of the present disclosure;

FIG. 4 is a cross-sectional view taken along the cutting line A-A' of FIG. 3;

FIG. 5 is a partial view showing a region "B" of FIG. 4 in an enlarged manner;

FIG. 6 is a cross-sectional perspective view showing an insulating disk included in the secondary battery of FIG. 4;

FIG. 7 is a partial cross-sectional view showing a state when the internal pressure of the secondary battery of FIG. 4 increases;

FIG. 8 is a partial view showing a region "C" of FIG. 7 in an enlarged manner; and FIG. 9 is a cross-sectional perspective view showing an insulating disk according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry them out. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" includes disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, the term "planar" refers to a target portion viewed from the upper side, and the term "cross-sectional" refers to a target portion viewed from the side of a cross section cut vertically.

FIG. 3 is a perspective view of a secondary battery according to an embodiment of the present disclosure. FIG. 4 is a cross-sectional view taken along the cutting line A-A' of FIG. 3. FIG. 5 is a partial view showing a region "B" of FIG. 4 in an enlarged manner.

Referring to FIGS. 3 to 5, a secondary battery 100 according to an embodiment of the present disclosure includes an electrode assembly 200, a battery case 300 that houses the electrode assembly 200 and is opened in its upper part, and a cap assembly 400 that is coupled to the opened upper part of the battery case 300.

First, the electrode assembly 200 according to the present embodiment may include a first electrode 210, a second electrode 220 and a separator 230. The first electrode 210, the second electrode 220 and the separator 230 can be wound together to form the jelly roll-type electrode assembly 200. The separator 230 may be interposed between the first electrode 210 and the second electrode 220. Further, in order to prevent the first electrode 210 and the second electrode 220 from contacting each other when wound in the form of a jelly roll, a plurality of separators 230 is preferably provided.

Although not specifically shown in the figures, each of the first electrode 210 and the second electrode 220 includes an electrode current collector and an active material layer formed by applying an electrode active material onto the electrode current collector. Further, the electrode tab may be attached to an exposed part of the electrode current collector, where the electrode active material is not applied, by a method such as welding. FIG. 4 shows a state in which the first electrode tab 213 attached to the electrode current collector of the first electrode 210 protrudes from the electrode assembly 200. Although not specifically shown in the figure, the second electrode tab (not shown) attached to the electrode current collector of the second electrode 220 may protrude in a direction opposite to that of the first electrode tab 213. That is, the first electrode tab 213 may protrude in a direction towards the cap assembly 400, and the second electrode tab (not shown) may protrude towards the bottom part of the battery case 300.

At this time, the first electrode 210 may be a positive electrode, and the second electrode 220 may be a negative electrode.

Meanwhile, the battery case 300 is a structure for housing the electrode assembly 200 impregnated with an electrolyte solution, and may include a metal material and may be a cylindrical case.

The cap assembly 400 according to the present embodiment may further include a current interrupt device (CID) 430; a safety vent 420 located on the current interrupt device 430 and electrically connected to the current interrupt device 430; and an insulating disk 500 located between the current interrupt device 430 and the safety vent 420. Further, the cap assembly 400 may further include an upper end cap 410 located at the uppermost end.

The safety vent 420 is a disk-shaped thin film structure through which current passes, and may include a protruding part 420p whose center part protrudes convexly in a lower direction, that is, in a direction towards the current interrupt device 430. The current interrupt device 430 is a disk-shaped plate member through which current passes, and may form a plurality of through holes for discharging gas.

The upper end cap 410 and the safety vent 420 may form a structure in close contact with each other. The safety vent 420 is located on the current interrupt device 430 and may be electrically connected to the current interrupt device 430. Specifically, the protrusion part 420p of the safety vent 420 and the center part 430a of the current interrupt device 430 may be physically and electrically connected to each other. The protrusion part 420p of the safety vent 420 and the center part 430a of the current interrupt device 430 may be connected to each other by the connection part 440 while being spaced apart from each other. Such a connection part 440 may be a metal member in the form of a column extending along the height direction, and the safety vent 420 and the current interrupt device 430 can be connected to each other by weld-joining.

A first electrode tab 213 protruding from the first electrode 210 may be connected to a lower end part of the current interrupt device 430.

The upper cap 410, the safety vent 420, the current interrupt device 430, and the first electrode tabs 213 are sequentially connected, and the upper cap 410 may serve as an electrode terminal which guides the electrical connection of the electrode assembly 200.

Next, the structure of the insulating disk according to an embodiment of the present disclosure will be described in detail with reference to FIG. 6 and the like.

FIG. 6 is a cross-sectional perspective view showing an insulating disk included in the secondary battery of FIG. 4.

Referring to FIGS. 4 to 6, the insulating disk 500 according to the present embodiment is located between the current interrupt device 430 and the safety vent 420 as described above. The insulating disk 500 may include an upper disk 510, a lower disk 520, and an elastic member 530 located between the upper disk 510 and the lower disk 520. Here, the disk means a disk-shaped member.

Although shown in a cross-sectional shape in FIG. 6 for convenience of explanation, the upper disk 510 and the lower disk 520 may be disk-shaped disk members. The upper disk 510 may come into contact with the safety vent 420, inter alia, the protrusion part 420*p*, and the lower disk 520 may come into contact with the current interrupt device 430.

An upper indented part 510D that is indented in an upper direction may be formed on the lower surface of the upper disk 510, and a lower indented part 520D that is indented in a lower direction may be formed on the upper surface of the lower disk 520. The elastic member 530 according to the present embodiment may be located between the upper indented part 510D and the lower indented part 520D.

The elastic member 530 is not particularly limited as long as it is a member having an elastic force. Due to the elastic force of the elastic member 530, a force in the upper direction may act on the upper disk 510, and a force in the lower direction may act on the lower disk 520.

The elastic member 530 may be a spring member as shown in FIGS. 5 and 6 as an example. At this time, the elastic member 530, which is a spring member, may be located between the upper disk 510 and the lower disk 520 in a compressed state. Therefore, as described above, the force in the upper direction may act on the upper disk 510 and the force in the lower direction may act on the lower disk 520.

Meanwhile, although the elastic member 530 of the coil-type spring is shown in FIGS. 5 and 6, it is not particularly limited as long as it is a material with elasticity, and thus a plate-shape spring is also possible. However, in consideration of the uniform action of the elastic force or the stable arrangement between the upper indented part 510D and the lower indented part 520D, a coil-type spring may be preferable.

A hole 500H may be formed in the insulating disk 500 according to the present embodiment. Specifically, an upper hole 510H is formed in the upper disk 510, a lower hole 520H is formed in the lower disk 520, and the upper hole 510H and the lower hole 520H are located so as to correspond to each other to form a hole 500H of the insulating disk 500. At this time, the above-mentioned connection part 440 may pass through the hole 500H and connect the current interrupt device 430 and the safety vent 420. In other words, the insulating disk 500 may be located between the current interrupt device 430 and the safety vent 420 while extending around the periphery of the connection part 440.

The insulating disk 500 preferably includes an insulating material in order to exhibit electrical insulation, and more preferably includes a polymer material having relatively strong strength. In one example, it may include at least one of Teflon, polypropylene (PP), and polyimide (PI).

Next, the function of the insulating disk in a situation where the internal pressure of the secondary battery is increased will be described in detail with reference to FIGS. 7 and 8.

FIG. 7 is a partial cross-sectional view showing a state when the internal pressure of the secondary battery of FIG. 4 increases. FIG. 8 is a partial view showing a region "C" of FIG. 7 in an enlarged manner.

Referring to FIGS. 7 and 8, when the internal pressure of the secondary battery 100 increases, the shape of the safety vent 420 may be reversed due to the internal pressure.

Specifically, the protrusion part 420*p* may be protruded convexly in a direction opposite to the direction in which the current interrupt device 430 is located. At this time, the current interrupt device 430 may include a center part 430*a* and an outer peripheral part 430*b* for extending around the center part 430*a*, and the center part 430*a* may be connected to the protrusion part 420*p* of the safety vent 420 through the connection part 440, and the outer peripheral part 430*b* may be connected to the first electrode tab 213.

As the shape of the safety vent 420 is reversed, the center part 430*a* is raised together with the connection part 440, so that the center part 430*a* and the outer peripheral part 430*b* of the current interrupt device 430 may be separated from each other. In order to induce this separation due to the increase in internal pressure, it may be designed to have a slightly weak strength between the center part 430*a* and the outer peripheral part 430*b*. The current between the upper end cap 410 functioning as an electrode terminal and the first electrode tab 213 is interrupted by the separation of the center part 430*a* and the outer peripheral part 430*b*.

On the other hand, for movement after separation of the center part 430*a*, the diameter of the upper hole 510H of the upper disk 510 and the lower hole 520H of the lower disk 520 forming the hole 500H of the insulating disk 500 is preferably larger than the diameter of the center part 430*a*. Meanwhile, the hole 500H of the insulating disk 500 may function as an internal passage that allows the generated gas to move toward the safety vent 420.

At this time, by the elastic force of the elastic member 530 according to the present embodiment, the upper disk 510 may be pushed in the upper direction, and the lower disk 520 may be pushed in the lower direction. When the shape of the safety vent 420 is not completely reversed or the external pressure is strong even if the internal pressure increases, the center part 430*a* and the outer peripheral part 430*b* of the current interrupt device 430 may not be completely separated and the contact can be maintained. However, in the present embodiment, the upper disk 510 can push the safety vent 420, particularly the protrusion part 420*p* in the upper direction, and the lower disk 520 can push the outer peripheral part 430*b* of the current interrupt device 430 in the lower direction. Consequently, the re-contact between the center part 430*a* and the outer peripheral part 430*b* is prevented, and they can be completely separated. In other words, when the internal pressure of the secondary battery 100 increases, the insulating disk 500 according to the present embodiment supplements the current interrupting function of the current interrupt device 430 to induce the current to be completely interrupted. Thereby, overcharge, overdischarge, and the like due to the re-contact can be prevented; ignition and explosion of the secondary battery 100 can be prevented; and safety can be enhanced.

Next, an insulating disk having a through-hole formed therein according to another embodiment of the present disclosure will be described with reference to FIG. 9. FIG. 9 is a cross-sectional perspective view showing an insulating disk according to another embodiment of the present disclosure.

Referring to FIG. 9, an insulating disk 500' according to another embodiment of the present disclosure may include an upper disk 510, a lower disk 520, and an elastic member 530, similarly to the insulating disk 500 described above. Further, the upper hole 510H and the lower hole 520H are formed so that the connection part 440 (see FIG. 5) can be located. At this time, the insulating disk 500' according to the present embodiment may have an upper through-hole 510TH and a lower through-hole 520TH formed in the upper disk 510 and the lower disk 520, respectively. The upper through-hole 510TH and the lower through-hole 520TH are located so as to correspond to each other, so that a through hole having a shape penetrating the insulating disk 500' can be formed.

The upper through-hole 510TH and the lower through-hole 520TH may function as a gas movement path that allows gas generated inside the secondary battery to move toward the safety vent 420. In addition to the upper hole 510H and the lower hole 520H, the safety vent 420 can operate smoothly when the internal pressure increases by additionally securing the movement path of the gas in the upper through-hole 510TH and the lower through-hole 520TH.

The number, diameter, and shape of each of the upper through-hole 510TH and the lower through-hole 520TH are not particularly limited as long as smooth gas movement is possible. That is, the upper through-hole 510TH and the lower through-hole 520TH may be provided by a single hole or by a plurality of holes, respectively, and various shapes as well as a circular shape are possible.

Meanwhile, referring back to FIG. 4, the battery case 300 may include a crimping part 310 and a beading part 320. The beading part 320 refers to a portion in which a part of the cylindrical battery case 300 is indented in the center direction of the electrode assembly 200, and is for stable coupling of the cap assembly 400 and preventing movement of the electrode assembly 200. The crimping part 310 is located on the beading part 320 and refers to a part for wrapping the cap assembly 400, which is for stable coupling of the cap assembly 400.

The sealing gasket 700 is mounted on the inner surfaces of the crimping part 310 and the beading part 320 to increase the sealing force between the cap assembly 400 and the battery case 300. That is, the gasket 700 can be located between the battery case 300 and the cap assembly 400 and one end part of the battery case 300 can be bent and crimp-coupled, thereby forming a crimping part 310. Thereby, the cap assembly 400 may be mounted and the secondary battery 100 may be sealed.

The CID gasket 800 may be formed so as to extend around the edge of the current interrupt device 430. Further, a part of the CID gasket 800 is extended between the safety vent 420 and the current interrupt device 430. After the current interrupt device 430 is separated, it is possible to prevent the safety vent 420 and the current interrupt device 430 from coming into contact with each other.

Although the terms representing directions such as front, rear, left, right, upper and lower directions are used herein, it would be obvious to those skilled in the art that these merely represent for convenience of explanation, and may differ depending on a position of an observer, a position of an object, or the like.

The above-mentioned secondary battery according to the present embodiment described above can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

200: electrode assembly
400: cap assembly
420: safety vent
430: current interrupt device
500: insulating disk

The invention claimed is:

1. A secondary battery comprising:
an electrode assembly;
a battery case housing the electrode assembly, the battery case having an open upper part; and
a cap assembly coupled to the open upper part of the battery case,
wherein the cap assembly includes:
a current interrupt device,
a safety vent physically connected with the current interrupt device and electrically connected to the current interrupt device, and
an insulating disk located between the current interrupt device and the safety vent,
wherein the insulating disk comprises an upper disk, a lower disk, and an elastic member located between the upper disk and the lower disk.

2. The secondary battery according to claim 1, wherein:
a lower surface of the upper disk includes an upper indented part defined by a recess extending in an upward direction within the lower surface of the upper disk,
an upper surface of the lower disk includes a lower indented part defined by a recess extending in a downward direction within the upper surface of the lower disk, and
the elastic member is located between the upper indented part and the lower indented part.

3. The secondary battery according to claim 1, wherein:
the elastic member is elastically biased so as to apply a force in the upward direction on the upper disk and a force in the downward direction on the lower disk.

4. The secondary battery according to claim 1, wherein:
the elastic member is a spring member.

5. The secondary battery according to claim 4, wherein:
the spring member is located between the upper disk and the lower disk in a compressed state.

6. The secondary battery according to claim 1, wherein:
the cap assembly includes a connection part connecting the current interrupt device and the safety vent.

7. The secondary battery according to claim 6, wherein:
a hole is defined in the insulating disk, and
the connection part passes through the hole to connect the current interrupt device and the safety vent.

8. The secondary battery according to claim 1, wherein:
the safety vent comprises a protrusion part protruding convexly towards the current interrupt device, and
the protrusion part is connected to the current interrupt device.

9. The secondary battery according to claim 8, wherein:
a shape of the protrusion part is configured to reverse when the internal pressure of the secondary battery increases, such that the protrusion part becomes protruded convexly in a direction away from the current interrupt device.

10. The secondary battery according to claim 9, wherein:
the current interrupt device comprises a center part connected to the protrusion part and an outer peripheral part extending around the center part, and the center part and the outer peripheral part are configured to be separated from one another when the shape of the safety vent reverses.

11. The secondary battery according to claim 1, wherein:

the insulating disk comprises an upper disk and a lower disk, the upper disk including an upper through-hole defined therethrough, and the lower disk including a lower through-hole defined therethrough, and the upper through-hole and the lower through-hole are positioned so as to align with each other.

12. A device comprising the secondary battery as set forth in claim 1.

13. The secondary battery according to claim 11, wherein the upper through-hole includes a plurality of upper through-holes, and the lower through-hole includes a plurality of lower through-holes.

\* \* \* \* \*